United States Patent [19]

Coale et al.

[11] 3,991,673

[45] Nov. 16, 1976

[54] NONFABRIC ENGRAVING BLANKET

[75] Inventors: Thomas E. Coale, Pensacola; Sidney W. Gunn, Cantonment; Frank Merrigan; Donald M. Tompkins, both of Pensacola, all of Fla.

[73] Assignee: St. Regis Paper Company, New York, N.Y.

[22] Filed: July 30, 1973

[21] Appl. No.: 383,556

Related U.S. Application Data

[62] Division of Ser. No. 277,281, Aug. 2, 1972, Pat. No. 3,818,832.

[52] U.S. Cl. .............................. 101/395; 101/401.1; 156/248; 156/289

[51] Int. Cl.$^2$ ...................... B41N 1/12; B32B 31/20; C09J 5/02

[58] Field of Search .......................... 101/401.1, 395; 156/248, 289

[56] References Cited

UNITED STATES PATENTS

| | | | |
|---|---|---|---|
| 1,233,298 | 7/1917 | Baekeland | 101/401.1 X |
| 1,367,180 | 2/1921 | Darrow | 156/289 X |
| 1,589,665 | 6/1926 | Schmutz | 101/395 |
| 1,597,432 | 8/1926 | Conant | 156/289 X |
| 1,849,598 | 3/1932 | Simms et al. | 101/401.1 |
| 1,941,148 | 12/1933 | Keltie | 101/395 |
| 1,942,683 | 1/1934 | Chambers | 101/395 |
| 3,276,947 | 10/1966 | Waterman | 101/415.1 X |

*Primary Examiner*—Clyde I. Coughenour
*Attorney, Agent, or Firm*—Woodling, Krost, Granger and Rust

[57] ABSTRACT

An engraving blanket which comprises an engraveable layer of live resilient rubber material vulcanized at one face to a face of a base layer of nonhard, nonresilient rubber material. Talcum powder is evenly dispersed between the vulcanized faces of the two layers to control the degree of adhesion between the two. This permits selected portions of the engraveable layer to be cut out and stripped from the base layer to produce a printing design and yet provides sufficient adhesion to keep the layers together during use of the blanket.

3 Claims, 3 Drawing Figures

NONFABRIC ENGRAVING BLANKET

This is a division of application Ser. No. 277,281 filed Aug. 2, 1972, now U.S. Pat. No. 3,818,832 issued June 25, 1974.

The present invention relates in general to what are commonly referred to as engraving blankets where a printing design is produced at the printing face of the blanket to perform a printing function.

Many prior art blankets include a cover sheet of a rubber composition which has a base or backing sheet of a canvas or cloth construction. In these constructions, problems arise in that the edges of the backing sheet fray and raise, causing problems during the printing operation. Frayed or raised edges cause undesirable lines or smudges in the printing operation.

Other prior art designs have involved the use of two or more layers of rubber-like material; however, no provision has been made to provide for the easy removal or stripping of selected portions of the printing layer from the base layer to form a printing design.

In the design of the engraving blanket of the present invention the problems involved with the canvas or cloth backing sheet have been obviated in that both the top engraveable layer and the base layer are constructed of a rubber composition without the use of cloth or canvas. In the present design provision is made for the convenient removal or stripping of selected portions of the engraveable layer to produce a desired printing design by placing a small but effective amount of an extremely fine grit talcum powder between the engraveable layer and the base layer before vulcanizing the two layers together in a press.

It is, therefore, an object of the present invention to provide an engraving blanket which obviates the abovementioned difficulties of the prior art and which is economical to produce, reliable in operation and has a substantial longevity.

Other objects and a fuller understanding of this invention may be had by referring to the following description and claims, taken in conjunction with the accompanying drawings, in which:

Figure 1:
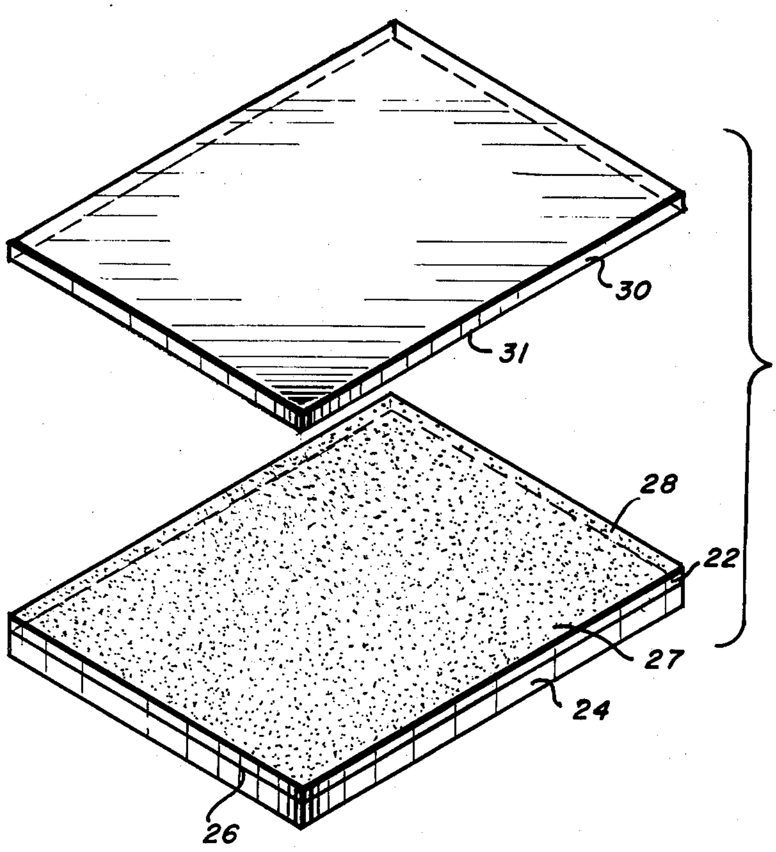
FIG. 1 is an isometric view of a step in making the engraving blanket of the present invention.
Figure 2:
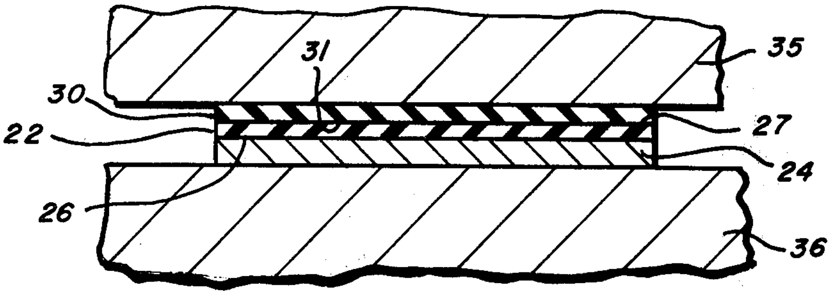
FIG. 2 is a fragmentary elevational view showing another step in making the engraving blanket.
Figure 3:
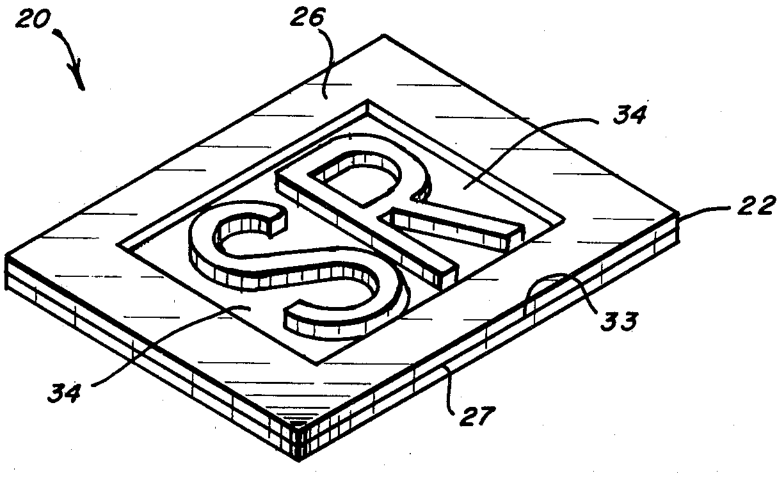
FIG. 3 is an isometric view of the completed engraving blanket.

FIGS. 1 through 3 best illustrate the method of making and the finished construction of the engraving blanket 20 of the present invention and FIG. 1 illustrates the placing of an engraving layer 22 of a rubber composition into contact with a plate of magnesium engraving metal 24. A printing face 26 of the engraving layer 22 is placed in contact with place 24 and this is to provide a very fine finish for the face 26 because of the nature of the magnesium from which the plate is formed. The engraving layer is also provided with what will be described as a stripping face 27.

After the engraving layer has been so placed, the stripping face 27 thereof is provided with a fine grit talcum powder 28 evenly dispersed over the surface thereof. The talcum powder is dispersed in an amount on the order of one-fourth gram for each square yard of stripping face 27 surface area.

A base layer 30 of a rubber composition having a stripping face 31 is next brought into contact with the engraving layer 22 with the faces 27 and 31 together and with the talcum powder 28 sandwiched therebetween. If desired, the talcum powder may be applied to face 31 of layer 30 before face 31 is brought into contact with face 27.

The so assembled plate 24, layer 22 and layer 30 are next placed in a vulcanizing press (FIG. 2) which includes upper and lower platens 35 and 36. The unvulcanized rubber composition layers 22 and 30 are vulcanized together in the press at a temperature of on the order of 130° C for about 15 minutes.

The assembly is then removed from the vulcanizing press and any flash of rubber composition is removed from around the edges of plate 24. The vulcanized layers 22 and 30 are removed from plate 24 and if desired the exposed surface of the base layer 30 may be ground to produce the overall desired thickness of the engraving blanket 20 which is then ready for engraving. As an example, the total thickness of the engraving blanket 20 may be on the order of 110 to 112 inch.

FIG. 3 illustrates the engraving process and here it will be seen that the letters S and R are produced. This is accomplished by utilizing a sharp instrument such as an engraving knife and cutting through the engraving layer 22 from the printing face 26 down to the contiguous stripping faces 27 and 31. The cut portions of engraving layer 22 are then stripped from face 31 of the base layer 30 to define the voids indicated by reference numeral 34 and the letters S and R are formed of the portion of the engraving layer which remains. The engraving blanket is now ready to perform its printing function by the application of a printing fluid to the printing face and impressing the same onto an object which is to be printed.

The rubber composition of the engraveable layer is an engraving gum stock of a live and resilient nature which is capable of a life of up to one million printing impressions. It may be a natural rubber composition having a Shore Durometer (Shore "A") Hardness of on the order of 50–55 after vulcanization. It may also be a vulcanizable polyblend made by mixing a polyvinyl chloride with a rubbery nitrile copolymer rubber with the vulcanizate exhibiting a Shore Durometer (Shore "A") Hardness of on the order of 50–55.

The rubber composition of the base layer is best described as being a nonresilient (i.e. dead), nonhard material which is compatible for vulcanization with the material of the engraveable layer. It may be of a natural or synthetic composition but is preferably a vulcanizable nitrile rubber which exhibits a Shore Durometer (Shore "A") Hardness of on the order of 50–55 after vulcanization. The nitrile rubber used is a butadiene-acrylonitrile copolymer with the butadiene content being more than 50% of the total weight. The nature of the base layer material is such that it is resistant to creeping or stretching as the engraving blanket is used.

The resiliency of the engraveable layer is relatively high compared to the resiliency of the base layer. In tests on standard rubber rebounding test machinery it has been found that the engraveable layer has a rebound value of on the order of 177 and the base layer in one instance had a rebound value of about 85 and in another instance a value of about 69. The figures represent comparative values with the higher the number representing the greatest rebound. It will be seen that the engraveable layer has at least two times the resiliency as the base layer.

The talcum powder 28 used is for the purpose of controlling the degree of vulcanization between the engraving layer 22 and the base layer 30. This can be explained in terms other than the amount of talcum used and the terms are the amount of force necessary to pull the two layers apart. The test to determine the force is made on what is known in the art as a Scott Model X-3 Test Machine. A sample of the engraving blanket of a size 1 inch × 10.25 inches is cut from the roll in the filling direction. The two layers are stripped away from each other a distance about 1 inch to 1½ inches. The sample is placed in the Scott Model X-3 and run at a speed of 2.5 inches/minute. A reading in pounds is recorded and the preferred adhesion between the layers in this invention gives a reading between 6 and 8 pounds.

It will thus be seen that the construction of the present invention provides for the convenient preparation of the printing face of the engraving layer and does away with the problems of blankets which utilize a canvas or cloth backing. The blanket of this invention is economical to produce and has a long commercial life.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

what is claimed is:

1. An engraving blanket consisting essentially of an engraveable layer of relatively live resilient material of a rubber composition and having a printing face and a stripping face, a base layer of relatively nonhard, non-resilient material compatible for vulcanization with the material of the engraveable layer and being of a rubber composition and having a stripping face, said stripping face of said engraveable layer and said stripping face of said base layer being contiguous to each other and being vulcanized together, a small, but effective, amount of talcum powder of on the order of one-fourth gram for each square yard evenly dispersed between said stripping face of said engraveable layer and said stripping face of said base layer and controlling the degree of attachment of vulcanization between said engraveable layer and said base layer, selected portions of said engraveable layer being removed from said base layer at said stripping faces thereby forming a selected printing design in said printing face.

2. An engraving blanket as claimed in claim 1, wherein said rubber composition of said engraveable layer is a vulcanizable natural rubber or a vulcanizable polyblend of polyvinyl chloride and a nitrile rubber and said rubber composition of said base layer is a vulcanizable nitrile rubber.

3. An engraving blanket as claimed in claim 2, wherein the Shore Durometer (Shore "A") Hardness of the engraveable layer and the base layer are on the order of 50 – 55.

* * * * *